United States Patent
Chatani

(10) Patent No.: US 7,401,151 B2
(45) Date of Patent: Jul. 15, 2008

(54) METHODS AND SYSTEMS FOR PROVIDING AUXILIARY CONTENT DURING USER INTERACTIVITY WITH DIGITAL DATA OVER A NETWORK

(75) Inventor: Masayuki Chatani, Foster City, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 0 days.

(21) Appl. No.: 11/361,121

(22) Filed: Feb. 24, 2006

(65) Prior Publication Data

US 2006/0143268 A1    Jun. 29, 2006

Related U.S. Application Data

(63) Continuation of application No. 09/771,751, filed on Jan. 29, 2001, now Pat. No. 7,171,480.

(51) Int. Cl.
G06F 15/16 (2006.01)
(52) U.S. Cl. .......................... 709/229; 709/217; 705/14
(58) Field of Classification Search ................. 709/227, 709/229, 217; 705/14
See application file for complete search history.

(56) References Cited

U.S. PATENT DOCUMENTS

| | | | | |
|---|---|---|---|---|
| 5,233,423 A | 8/1993 | Jernigan et al. | ............. | 358/181 |
| 5,532,735 A | 7/1996 | Blahut et al. | ................... | 348/13 |
| 5,740,549 A | 4/1998 | Reilly et al. | ................... | 705/14 |
| 5,838,314 A | 11/1998 | Neel et al. | ................... | 345/327 |
| 5,913,040 A | 6/1999 | Rakavy et al. | ......... | 395/200.62 |
| 5,926,624 A | 7/1999 | Katz et al. | .................... | 709/47 |
| 5,937,158 A | 8/1999 | Uranka | ........................ | 713/200 |
| 5,937,164 A | 8/1999 | Mages et al. | ................ | 709/200 |

(Continued)

FOREIGN PATENT DOCUMENTS

JP    10-275114    10/1998

(Continued)

OTHER PUBLICATIONS

Chatani et al., "*Method and System for Enabling Optional Customer Election of Auxiliary Content Provided on Detachable Local Storage Media During Access of Primary Content Over a Network and for Collecting Data Concerning Viewed Auxiliary Content*", U.S. Appl. No. 09/452,811, filed Dec. 2, 1999.

*Primary Examiner*—Kenny Lin
(74) *Attorney, Agent, or Firm*—Martine Penilla & Gencarella, LLP

(57) ABSTRACT

A method and system for presenting auxiliary content to a client during download of primary content from a server is provided. The system includes a server network including a server that manages primary content and a client computer connectable to the server. At the client computer, local storage for storing user information and auxiliary content is provided. In one example, the auxiliary content is stored in the local storage prior to download of the primary content from the download management server. The user information is communicated from the client computer to the server, and the user information is used to direct initial access to primary content. Then, specific portions of the auxiliary content stored in the local storage device is displayed at the client computer during download of the primary content.

14 Claims, 3 Drawing Sheets

U.S. PATENT DOCUMENTS

| | | | |
|---|---|---|---|
| 6,026,368 A | 2/2000 | Brown et al. | 705/14 |
| 6,049,823 A | 4/2000 | Hwang | 709/218 |
| 6,101,534 A | 8/2000 | Rothschild | 709/217 |
| 6,108,637 A | 8/2000 | Blumenau | 705/7 |
| 6,195,693 B1 | 2/2001 | Berry et al. | 709/219 |
| 6,237,039 B1 * | 5/2001 | Perlman | 709/237 |
| 6,279,036 B1 | 8/2001 | Himmel et al. | 709/224 |
| 6,314,451 B1 | 11/2001 | Landsman et al. | |
| 6,400,996 B1 | 6/2002 | Hoffberg et al. | 700/83 |
| 6,405,214 B1 | 6/2002 | Meade, II | 707/104.1 |
| 6,453,420 B1 | 9/2002 | Collart | 713/201 |
| 6,684,249 B1 * | 1/2004 | Frerichs et al. | 709/225 |

FOREIGN PATENT DOCUMENTS

| | | |
|---|---|---|
| JP | 2000-137721 | 5/2000 |

\* cited by examiner

METHODS AND SYSTEMS FOR PROVIDING AUXILIARY CONTENT DURING USER INTERACTIVITY WITH DIGITAL DATA OVER A NETWORK

CROSS REFERENCE AND PRIORITY CLAIM

This Application is a continuation of U.S. application Ser. No. 09/771,751, filed Jan. 29, 2001 now U.S. Pat. No. 7,171, 480, entitled "METHOD AND SYSTEM FOR PROVIDING AUXILIARY CONTENT LOCATED ON LOCAL STORAGE DURING DOWNLOAD/ACCESS OF PRIMARY CONTENT OVER A NETWORK." This Application is hereby incorporated by reference.

This Application is also related to co-pending U.S. application Ser. No. 09/452,811, filed on Dec. 2, 1999, and entitled "METHOD AND SYSTEM FOR ENABLING OPTIONAL CUSTOMER ELECTION OF AUXILIARY CONTENT PROVIDED ON DETACHABLE LOCAL STORAGE MEDIA DURING ACCESS OF PRIMARY CONTENT OVER A NETWORK AND FOR COLLECTING DATA CONCERNING VIEWED AUXILIARY CONTENT. This Application is hereby incorporated by reference.

FIELD OF THE INVENTION

The present invention relates to systems and methods for providing auxiliary content located on local storage to a client connected to a primary content provider over a bi-directional network, and more specifically to accessing auxiliary content during download/access of primary content over the network, enabling dissemination of auxiliary content during otherwise dormant wait periods.

BACKGROUND

In recent years, improvements in the ability for members of the public to access valuable entertainment content by connection to relatively low cost high speed bi-directional networks has raised interest in advertisers seeking to exploit such systems for promotion of goods and services to users of these networks.

Current methods and trends to advertise over such networks are frequently unsatisfactory due to their failure to provide a satisfactory combination of incentive and acceptable amount of effort on the part of the users targeted by the advertisements, or by excessive advertiser commitments (i.e., effort, expense, time, etc.). This is particularly true with regard to methodology that requires users to perform substantial amounts of data entry or other time-consuming tasks to acquire access to content and services that are initially indicated to be readily available or free. Oftentimes such methodology can also require a user to enter sensitive personal information, such as home address and/or credit card information, which may also be unacceptable to the user. For advertisements that require more efficient involvement of user interaction, this trend of requiring substantial expenditure of effort and/or disclosure of sensitive information, coupled with the subsequent wait period during download of the desired content has significant drawbacks.

Another related trend has been to offer certain services, such as network access, or access to specialized content, e-mail accounts, e-fax accounts, and so forth, over a network connection, for free to customers who are willing to sign up and provide detailed personal identifying information to be maintained in a server database. In return for providing such customer information, the service provider provides desired access to services, for example an e-mail account, to the customer for free or at reduced cost, with the provision that the customer must then view attached advertisements, which may be targeted to the customer based on his or her identifying information, browsing activity, etc. Such advertisements can be attached to customer e-mail or appear in pop-up windows or frames which are generated upon accessing the server network. By such systems, the costs necessary for maintaining the network services or paying for network content can be paid for by advertising revenues, whereas the customer gains access to desired services by release of certain personal information and being forced to view targeted commercial advertisements.

However, despite their popularity as an advertising medium, such systems suffer from the drawback that customers, in general, do not like being forced to view advertisements or commercials in this fashion. In addition, many customers are reluctant to give up personal information, particularly to advertisers, in exchange for free network services or free access to content over a network. Thus, a need exists for improvement in when and where a user wishes to view auxiliary content. At the same time, flexibility needs to be provided to advertisers in terms of the manner in which such auxiliary content is delivered to customers, so that advertisements can be presented in a non-offending way more likely to appeal to customer interest. Therefore, more flexible systems have been sought in which auxiliary content can be provided to customers.

According to one known system, embedded commercials may be provided in a memory device installed in a television receiver, the commercials being displayed on a portion of the screen through use of a graphics generator when a control function on the television receiver is activated. Local storage of advertisements may be done on a programmable read-only memory (PROM), however, this system places a heavy burden on advertisers who must establish access with the PROM device in some manner through a server network.

According to another known technique, advertisements may be provided over a computer network or on a local storage device such as a CD-ROM and displayed on a local computer. The advertisements displayed on the local computer can be selected based on pre-configured user preference information, such as which types or categories of advertisements a given user may choose to view. Here, the main feature intended to be accessed by this system is simply the internet as a whole, so there is no linkage or association between predetermined primary content and auxiliary advertising content. There is no suggestion that advertisements are provided on local removable storage which acts as the means (or key) by which customers gain access to predetermined content servers providing valuable information such as movies, interactive games, programs, and so forth.

Therefore, current methods of advertisement in the computer network environment do not contain the incentives and ease-of-use necessary to provide auxiliary content efficiently and at optimal times, and thereby provide effective and successful advertisement content.

SUMMARY

A system and computer-based method for providing auxiliary content located on local storage to a client connected to a primary content provider over a network, particularly during transfer of primary content via a server dedicated to download operations. Control over the auxiliary content, primary content and/or the download management server is exercised by a distributor. The system includes the download management server, a customer database and a primary content database on the server side, and a client console including a local storage device containing the auxiliary content on the client side. The auxiliary content provided can be varied based on one or more user preferences, one or more distributor preferences, or a combination of both user and distributor preference information. With respect to user preferences, either previously acquired information is used or the user is prompted to chose from a selection of specific content items and categories of content; default content is provided if no user preferences are available/selected. With respect to distributor preferences, the download management server sends the user auxiliary content assignment data before sending the requested primary content; according to the data, the client computer executes the appropriate auxiliary content stored in the local storage. The auxiliary content is stored in the local storage prior to download of the primary content from the download management server, though the user can acquire the local storage and/or auxiliary content by a variety of means (e.g., the auxiliary content can be provided on a CD-ROM, sent to a client hard drive over the network, etc.).

A general aspect of the present invention is to provide a system and method whereby advertisements or auxiliary content are made available to customers via removable local storage, such as a DVD or CD-ROM disc, which is intended to be inserted into a client console connected via a bi-directional network to a specified content provider, wherein the client console includes a control function for enabling the auxiliary content such as advertisements to be viewed, at the option of the customer, while the customer accesses valuable content from a primary content database maintained solely by the content provider.

A further aspect of the invention is to provide a system and method as described above, wherein a customer database is maintained in the server station, containing identifying information of users who access the server station, wherein such identifying information is capable of being downloaded into the client console in order to enable only auxiliary content which is customized based on a user's identification profile to be loaded and viewed.

A further aspect of the invention is to provide key data, which may include a local storage device identifier or customer identifier and an authentication code, on removable local storage on the client side of the system, whereby the key data is used to authenticate access to a specified server station which provides primary content, and whereby such primary content cannot be accessed unless the local storage is inserted into the client console.

As a result of the above-described examples, improvements over known advertisement methods can be achieved. As an advertisement medium, by use of local storage such as CD-ROM or DVD, there is no need as in the prior art for advertisers to expend costs for maintenance of a large-scale advertisement database on the server side of the system. Therefore, advertisers are afforded great flexibility in preparing their own advertising content on relatively low cost packaged storage media, where at the same time advertisers can associate their auxiliary content with specified valuable primary content downloadable from a main primary content provider.

Furthermore, the cost and time associated with downloading of large-volume auxiliary data can be avoided. Because the cost of packaged storage media such as CD-ROM or DVD is relatively low, advertisers have the advantage of being able to easily distribute such devices as inserts in magazines and the like. In addition, because of their ability to hold large amounts of data, such removable packaged storage media have the ability to handle multicolored animation or other lengthy auxiliary content, which is highly suitable for advertisements.

An advantage of the present invention is the ability for content providers to associate their auxiliary content with specified highly popular and valuable primary content such as feature movies, interactive games, popular utility programs and the like, which are downloaded from the main content server. That is, merely by contracting with and following a prescribed format determined by the primary content provider, advertisers are then able to easily manufacture their own advertisement containing CD-ROM or DVD discs which are easily distributed to customers. Because of their association with popular and valuable primary content, customers become highly motivated to use CD-ROM or DVD as a means for gaining access to the primary content.

The above and other aspects, features and advantages of the present invention will become apparent from the following description when taken in conjunction with the accompanying drawings in which preferred embodiments of the present invention are shown by way of illustration and not limitation.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A system and method for providing auxiliary content located on local storage to a client connected to a content provider over a bi-directional network is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention may be implemented on one or more computers executing software instructions. According to one embodiment of the present invention, server and client computer systems transmit and receive data over a computer network or standard telephone line. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers.

Download Management System and Server Architecture

Figure 1:
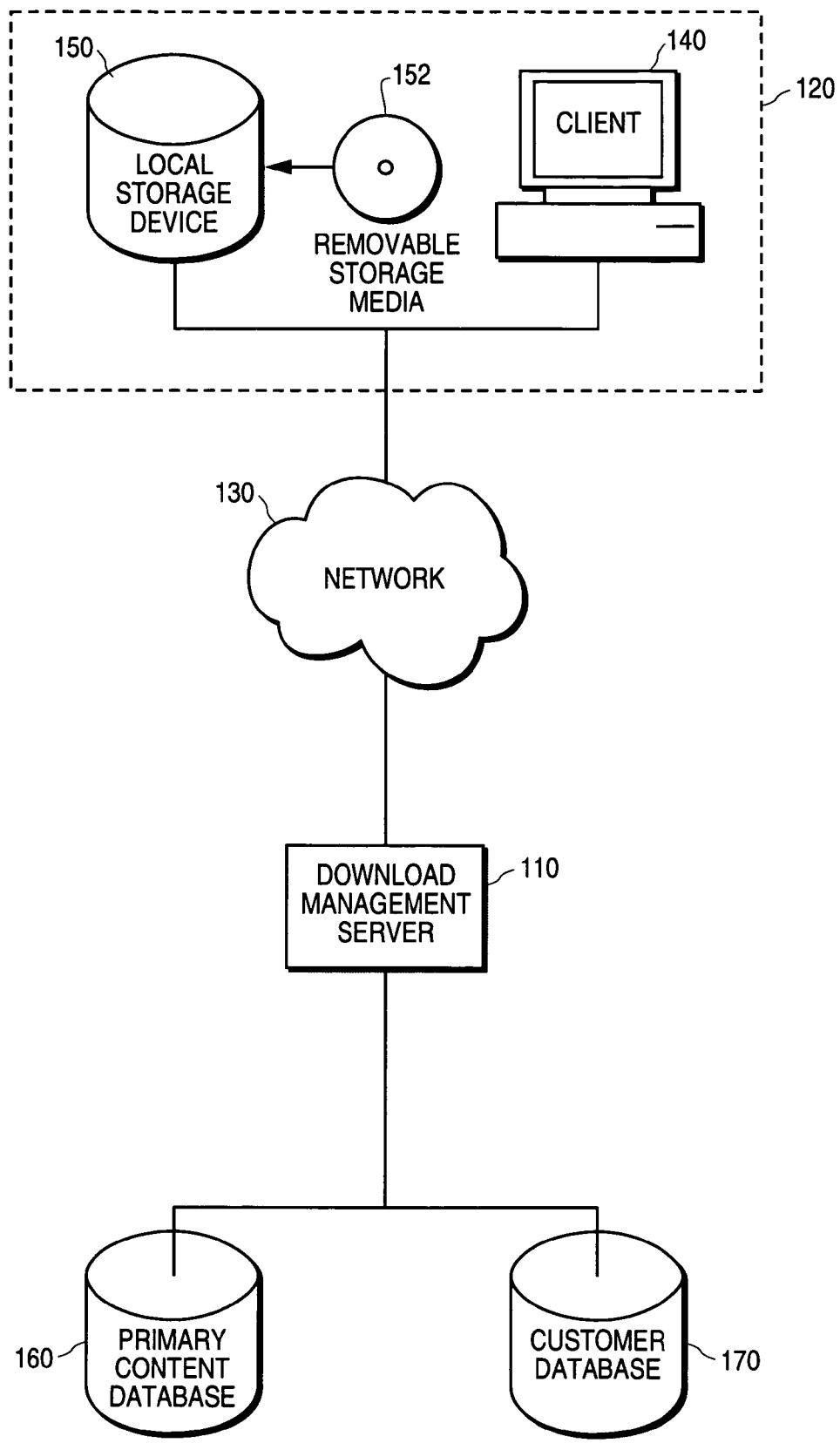
FIG. 1 illustrates a block diagram of a computer network system that implements embodiments of the present invention.

FIG. 1 is a block diagram of a computer network system that can be used to locate and transmit requested content from a primary content database while providing designated auxiliary content stored in local storage media, according to embodiments of the present invention. The download management system 100 of FIG. 1 enables the auxiliary content to be varied based on preferences of system participants during download of primary content over the download management server 110. Control over the auxiliary content, primary content and/or the download management server 110 is exercised by a distributor. The auxiliary content provided can be varied based on one or more user preferences, one or more distributor preferences, or a combination of both user and distributor preference information.

FIG. 1 shows the configuration of a system for enabling display of auxiliary content during download of primary content, according to embodiments of the present invention. The term "primary content" should be understood to refer to a collection of downloadable content which may consist of any one of video linear streaming data, such as a motion picture in the MPEG2 format, linear audio streaming data such as MP3 data, binary program data, including game data, or any combination of such data. This definition is intended to describe the types of data broadly, and is not limited to any specific data formats such as MPEG2 or MP3. On the other hand, excluded from the definition of "primary content" are data functioning solely to provide access to a network, for example, browser software or protocol handlers, whose main function is only to establish a network connection. "Auxiliary content" refers to the same types of data. "Auxiliary" can be distinguished from "primary" in terms of distributor or advertiser priority, or in terms of the user's priorities or preferences (i.e., one type of content might be more important to a user, and thus 'primary'). In terms of data types, "primary content" and "auxiliary content" are coextensive.

With regard to system configuration, as seen in FIG. 1, the download management system 100 is made up of a server side system comprising a download management server 110, a primary content database 160, and a customer database 170, which are interconnected by a bidirectional network 130. The download management server 110 is shown connected directly to the databases 160, 170 in this embodiment of the server side system, however server connection to these or comparable databases can be made over any type of network as well. The "primary content" as described in the preceding paragraph is stored in the primary content database 160. The customer database 170 contains a collection of data about individual customers who access the download service through the network 130. The data for individual customers may consist of the customer's name, home address, age, gender, occupation, income, hobbies and interests, information about family members, purchasing history, preference of gender in content viewed, or any other descriptive information about a user which may be beneficial to advertisers in targeting auxiliary content to customers. Further, such customer data is not static, but can be updated based on a user's access history of the primary content data, for example, data concerning which primary content is accessed and/or how many times a given category (e.g. type of music, genre of movies, etc.) of primary content is accessed may be recorded and used for updating the customer data, thereby enabling advertisers to tailor their advertisements more effectively to a given customer.

The download management server 110 is a server system that is set up to handle download requests from a user. Access to the server 110, which may comprise one of several servers, is facilitated through a typical device known as a router (not shown) on the network 130, which directs requests to the download management server 110. When the server 110 receives requests from a client console user, the server executes a download of requested primary content from the primary content database 160. Along with processing requests for downloading of primary content, the server 110 also retrieves the requesting user's customer data from the customer database 170 and can attach it with the requested primary content, transmitting both via the network by means of a known networking protocol standard, such as ftp (file transfer protocol).

The network 130 may be the Internet, a Wide Area Network (WAN), a Local Area Network (LAN), or any combination thereof. The network is normally a bi-directional digital communications network that connects a client's terminal hardware with the download management server 110. With current technologies, a CATV (cable television) bi-directional network, ISDN (Integrated Services Digital Network), DSL (Digital Subscriber Line), or xDSL high-speed networks are examples of existing network infrastructures enabling the necessary network connections for implementing embodiments of the present invention, though they are not intended to be exclusive as to the types of networks capable of practicing the present invention. In one embodiment, network 130 may represent the Internet, in which case the server 110 typically executes a web server process to transmit data in the form of HTML data to client computers executing web browser processes.

As shown in FIG. 1, the download management system 100 includes a client side made up of a client console 120 comprising a client 140, and, optionally, a local storage device 150 that can include a removable storage media 152 component. The client 140 can be a personal computer, a set top box, a computer/gaming device such as PlayStation®2, a computing device of comparable capabilities, or any terminal device providing access to the system. The local storage device 150 can be any conceivable data storage device (e.g., CD- or DVD-ROM, hard disk drive, magnetic, optical or other card drive, zip drive, etc.), and may be, and frequently is, integral with the client 140, though is depicted here as a distinct element. Additionally, the removable storage media 152 can be compatible and removable directly with the client 140; this may be true for embodiments both where the local storage device 150 is external or where it is internal to client 140.

According to one preferred embodiment, removable storage media 152 is specifically intended to be used in a networked environment and to operate in consort with downloaded primary content retrieved through a network connection, in order to provide linked or associated auxiliary content that is customized based on user and/or distributor preferences. For example, removable storage media 152 can store a collection of interactive or non-interactive auxiliary content, for example advertisements that may be made up of video images, animations, sounds, applets, etc. In this preferred embodiment, the removable storage media 152 comprises a CD-ROM disc or DVD disc. Moreover, each item of auxiliary content can include appended "trigger data" which is appended as an access flag to the auxiliary content, as shall be discussed in further detail below.

Figure 2:
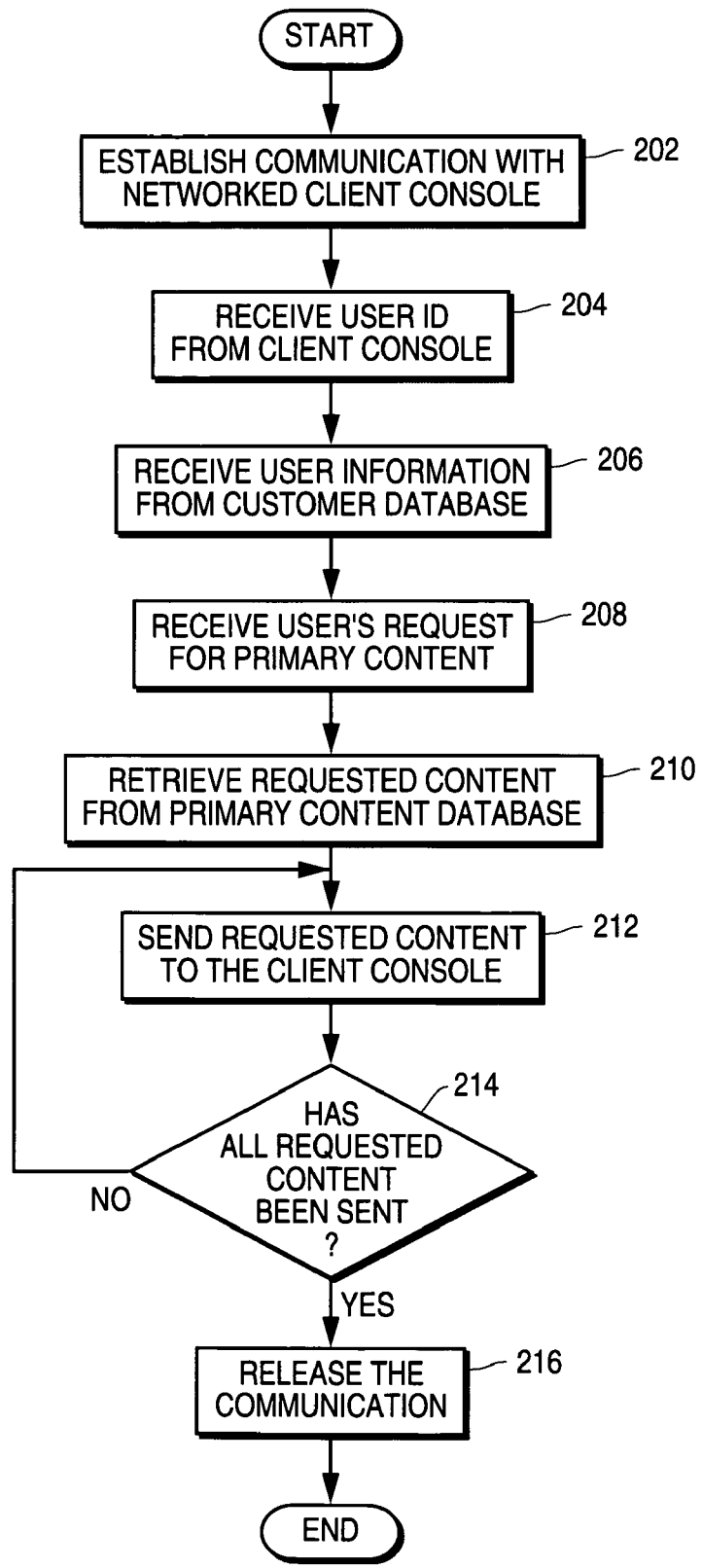
FIG. 2 is a flowchart that illustrates some download management server steps taken in providing the desired auxiliary content during download of primary content, according to one embodiment of the present invention.

FIG. 2 is a flowchart that illustrates some download management server steps taken in providing the desired auxiliary content during download of primary content, according to one embodiment of the present invention. Execution of this download management process requires the receipt of necessary user identification and requested content information, as well as the transmission of requested content to the client console. Once a user desires to download primary content, the user will make association with the client terminal 140 portion of the client console 120 (FIG. 1). The subsequent steps that the download management server goes through to provide both the primary and auxiliary content, as shown herein, begin after this initial step of the user associating him or herself with the client console.

According to the embodiment of FIG. 2, a download management server first performs the step of establishing communication with a networked client console, step 202. Here, as best seen in FIG. 1, the communication is indicated as being established with a client console 120, however, it should be understood that this term is interchangeable with client 140 (the client terminal) throughout these discussions for the purpose of disclosing other embodiments not limited by a definable client console. Once communication has been established with the client console, the download management server then receives a user ID from the client console, step 204, for the initial purpose of identifying the particular user.

Next, in step 206 of this embodiment, the download management server retrieves user information from the customer database; this user information consisting of the data for individual customers discussed above with respect to FIG. 1. The download management server then proceeds to step 208 where the user's request for content is received. After receiving such user request information, in step 210, the download management server finds the requested content from the primary content database.

In the subsequent step, step 212, the download management server sends the requested content to the client console. After such sending of requested content, in step 214, the download management server verifies whether all of the requested content has been sent. If all of the requested content has not been sent, the server will maintain a state of sending the requested content to the client console. Once all of the content has been sent, however, the download management server moves on to the final operation. The last operation of this embodiment is simply the release of communication between the download management server and the client console, step 216.

Figure 3:
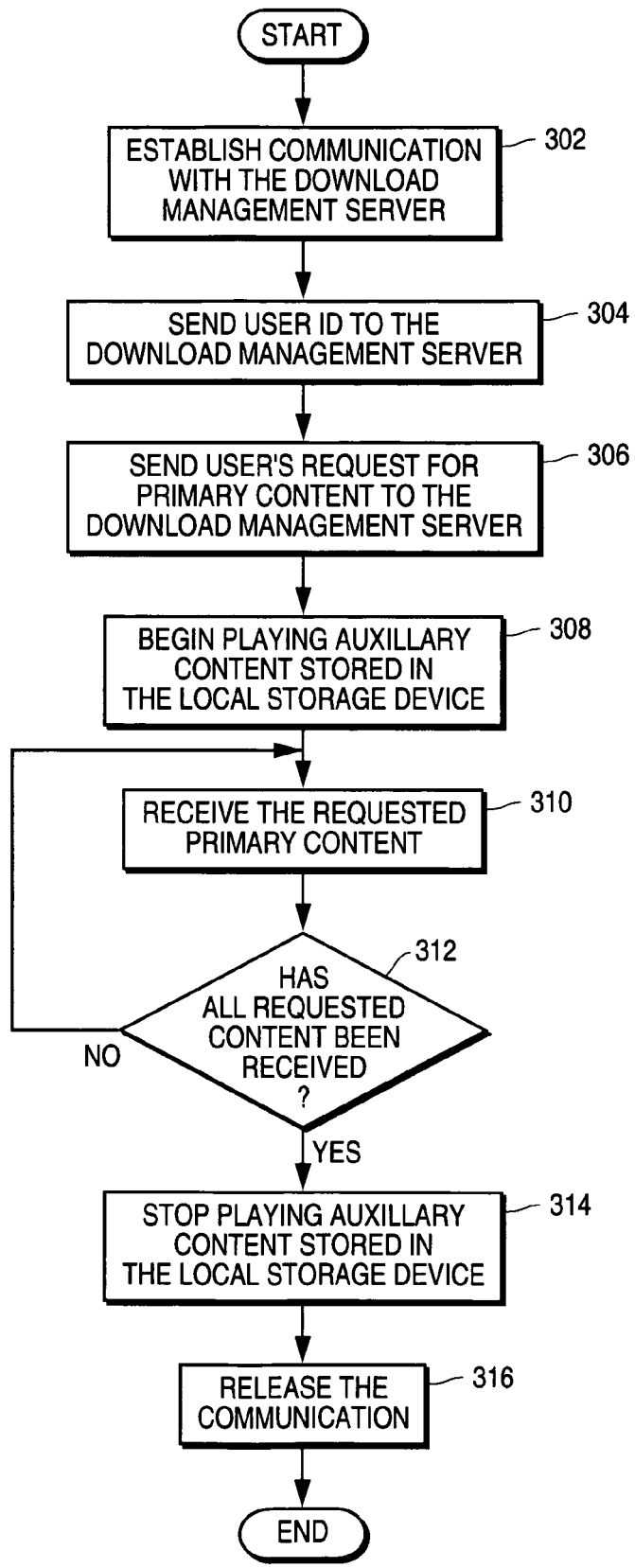
FIG. 3 is a flowchart that illustrates some client-side steps taken in providing the desired auxiliary content during download of primary content, according to one embodiment of the present invention.

FIG. 3 is a flowchart that illustrates some client-side steps taken in providing the desired auxiliary content during download of primary content, according to one embodiment of the present invention. The preliminary steps of this client-side process mirror the comparable steps of FIG. 2 as they occur in a mutually exchanged fashion, and also begin with the user making association with the client 140 portion of the client console 120 (FIG. 1) with the desire to download primary content. The subsequent steps of FIG. 3, then, also begin after this initial step of the user associating him or herself with the client console.

Correspondingly, the first three steps of FIG. 3, establishing communication, step 302, sending a user ID, step 304, and sending user request for primary content, step 306, are client side steps describing behavior done with the download management server that precisely mirror steps 202, 204 and 208 from FIG. 2, and no additional description is warranted. The next client side step, step 308, is to begin playing auxiliary content stored in the local storage device. The auxiliary content played as a result of this step can be default auxiliary content or can be selected according to preferences and procedures originating on the client side in the client console; additionally, the auxiliary content can be dictating by distributor preferences and procedures transmitted over the network immediately prior to provision of the auxiliary content. As a specific example of such client side procedure, a comparison can be made between various data contained in the user information, which may also include information of the currently requested primary content, and trigger data appended with each of the auxiliary content, and for those items for which a match is found, the auxiliary content is extracted. The auxiliary content items are then played/executed along with the primary content.

The client console then receives the requested primary content, as shown in step 310. After receiving such content, in step 312, the client verifies whether all of the requested primary content has been sent. If all of the requested primary content has not been sent, the client console will maintain a state of receiving the requested content from the download management server. Once all of the content has been sent, however, the client moves on to the final two operations. First, the client stops playing the auxiliary content stored in the local storage device, step 314, then, in final step 316, the communication with the download management server is released.

Download Management System Functionality

During operation of the preferred embodiments, the client console 120 receives and downloads the designated primary content, wherein the downloaded primary content is stored on the local storage media such as a hard disk drive HDD or any conceivable externally attached re-writable storage medium, as discussed above. The auxiliary content to be provided during download can be: (1) static content specifically associated with the primary content, (2) content variable based on user or distributor preferences, as detailed immediately below, and/or (3) variable content selected on either the server side or the client side, as described in more detail further below.

In these preferred embodiments, the auxiliary content provided can be varied based on one or more user preferences, one or more distributor preferences, or a combination of both user and distributor preference information. With respect to user preferences, either previously acquired information is used or the user is prompted to chose from a selection of specific content items and categories of content; default content is provided if no user preferences are available/selected. With respect to distributor preferences, the download management server sends the user auxiliary content assignment data before sending the requested primary content; according to the data, the client computer executes the appropriate auxiliary content stored in the local storage.

In all of the embodiments, the content may be separated into categories to facilitate selection of the appropriate content for particular users, and for other functionality. For example, the content might be categorized into: (1) images, movie data, and other audiovisual content, (2) music, (3) games, such as video game software, (4) customer surveys, and/or (5) lots, or related interactive polling data. With regard to such customer surveys and lots, the interactive user results are sent to the download management server, and can be used to various advantages, such as to assist in the selection of auxiliary content or to obtain updated customer profiles.

During operation of another preferred embodiment, the client console 120 receives downloaded primary content together with attached user information that is acquired by the download management server by means of a user identification code (as described in more detail below). The user identification code may provide data sufficient for the download management server to identify the user anywhere from broadly, such as by category of how the user acquired a piece of removable storage media, to very specifically, such as an individual user from a mailing list of such prospective customers. The access software first accesses and loads one or more interactive or non-interactive auxiliary content files which match the downloaded user information and/or the downloaded primary content. More specifically, a comparison is made between the user information and "trigger data" contained within each piece of auxiliary content, and if data contained in the trigger data match with the user information, the auxiliary content item is then loaded and queued for playback in the client console 120.

In addition, a given request for specified primary content may also spawn the loading and queuing of specific auxiliary content. Such specific auxiliary content, for example, might be interactive content wherein various questions may be asked of the user or other user behavior monitored, which can then form part of download record and be used for updating information on the customer in the customer database 170. In the case of non-interactive content, information of which advertisements have been viewed might later be used to update customer information.

In the preferred embodiments, in general, removable storage media 152 stores data comprising auxiliary content to be viewed by the user of the client console, wherein the auxiliary content is made up of a plurality of content items each with an appended set of trigger data. The removable storage media 152 can further hold a unique media identification section, which serves for identifying the removable storage media itself (such as an alphanumeric CD-ROM/DVD serial number), and an authentication code which is used for authenticating access to the download management server 110, and which can also establishes a user identifier for the user who utilizes the removable storage media 152 in the client console 120. It is conceivable that the media identification code and the authentication code could be the same, although preferably the functions of server access and storage media/customer identification are facilitated by separate codes. Alternatively, the media identification section can comprise a software program that generates a unique user identifier in association with a prompt for user input of initial user data, such as the name address, etc. of the user. It should be understood that once the media identification becomes associated with user information, the media identification operates as a user identifier, so these terms might be used interchangeably hereinafter.

In any embodiment, a user identification code and authorization code also serve jointly as an enabling key through which access to given primary content is authorized by the download management server 110. More specifically, when the media identification code is uploaded to the server 110, on the basis of this code, the server 110 can determine which primary content, from among multiple content in the primary content database 160, are authorized for access to the user on the basis of the user identifier. Should such a media identifier not be present, or be deemed to be incorrect or outdated, access to the primary content is suspended. Thus, the correct removable storage media 152 must be present in the client console, and a correct and non-outdated removable storage media identifier must be determined, in order for access to the server 110 to be authorized. Another possibility is that the authorization code provides access to a given server dedicated for downloading of specified primary content from among multiple content in a primary content database 160.

The removable storage media 152 can additionally contain a network access data piece indicating that the removable storage media 152 is intended for interaction with a server in a networked environment. This indicator may itself comprise network access software which enables the necessary network connection, or may simply comprise a flag indicating that network software residing in the client console 120 should be loaded and executed. In the latter case, the network software residing in the client console 120 may comprise a small program for establishing a minimal network connection to enable more versatile network software to be downloaded from the server and executed in the client console 120.

In environments where it is desired that only some of the available primary content is downloadable to a given user, the user may be presented with a menu option which displays only those primary content items, from among all items contained in the primary content database 160, that are authorized to the user for downloading and viewing, thereby facilitating selection by the user. While menu options may be provided as a function of a menu routine executed from the removable storage media 152, the server side the download management server 110 is capable of controlling which primary content is downloadable based on the media identification code. In other words, the user cannot request primary content that is not authorized for the applicable media identification code.

In the broadest preferred embodiment, the auxiliary content is executed for playback while the requested primary content is downloading. The auxiliary content stored in the local storage device is played by the client console during download of the primary content until the primary content is finished downloading. It shall be understood that other modes for execution of auxiliary and primary content are to be contemplated within the knowledge of persons skilled in the art. For example, the auxiliary content can be played back before the running of the primary content, so that the user is not permitted to view the primary content until after the auxiliary content has been viewed, or otherwise run its course, for example by interaction with the user in the case of interactive content. Interaction between primary and auxiliary content is also possible. For example, in the case where the primary content is an interactive game, the appearance of a character, scene or other data item in the primary content can be used to trigger actions in the auxiliary content.

It is significant not only that the auxiliary content is provided via removable storage media 152, but also that the system enables a pairing or linkage between the auxiliary content on the removable storage media 152 and specified downloadable primary content, and wherein, by means of key data on the storage media, the removable storage media 152 provides the avenue of access to the primary content. In this manner, auxiliary content providers, typically advertisers, are able to direct removable storage media 152 to customers whose motivation will be to access valuable and popular primary content, whereas the primary content provider, through the key, can additionally control access to primary content based on a specified time period during which the removable storage media 152 can be used.

It shall be understood that various modifications will be apparent and can be readily made by persons skilled in the art without departing from the scope and spirit of the present invention. Accordingly, the following claims shall not be limited by the descriptions or illustrations set forth herein, but shall be construed to cover with reasonable breadth all features foreseeable equivalents by those skilled in the art.

What is claimed is:

1. A system for presenting auxiliary content to a client during download of primary content from a server, comprising:
    a server network including the server that manages the primary content;
    a client computer connectable to the server; and
    at the client computer, local storage for storing user information and auxiliary content, wherein the auxiliary content is stored in the local storage prior to download of the primary content from the server;
    whereby the user information is communicated from the client computer to the server, the user information being used to direct initial access to specific content of the primary content, and specific portions of the auxiliary content stored in the local storage device is displayed at the client computer during download of the primary content, and the specific portions of the auxiliary content being identified based on the specific content of the primary content, and based on the user information.

2. The system according to claim 1, wherein the auxiliary content is variable based on a user preference.

3. The system according to claim 2, wherein the client preference is determined by prompting the client to input information settings, and by providing the client with a selection of one or more individual content choices and one or more content category choices.

4. The system according to claim 1, wherein the auxiliary content is variable based on a distributor preference.

5. The system according to claim 4, wherein the distributor preference is determined first by having the server send client preference data usable to assign content before sending requested content, and second by having the client computer execute content stored in the local storage according to the preference data.

6. The system according to claim 1, wherein the auxiliary content is provided on portable storage that stores the auxiliary content and is suitable for distribution.

7. The system according to claim 1, wherein the auxiliary content is selected from the group consisting of one or more of advertisements, images, movies, music, games, and customer surveys.

8. A method for presenting auxiliary content from a local storage device during download of primary content from a server, comprising:
    establishing a link between a client computer and a server, the client computer having the local storage device connected thereto;
    transmitting user identifier data contained on said local storage device and a request for primary content to the server, in order to retrieve said primary content from the server;
    accessing the auxiliary content stored on the local storage device during download of the primary content to the client computer, the auxiliary content to be accessed by the client computer based on preferences provided by a distributor of the primary content; and
    displaying the accessed auxiliary content at a display associated with the client computer during download of the primary content.

9. The method according to claim 8, wherein said user identifier data comprises an alphanumeric media ID identifying a media in said local storage device and said media further contains an authentication code which enables access to said server, further comprising the step of receiving said media ID and said authentication code in said server, wherein one of said authentication code or said media ID serves to limit access on the server to specified primary content from among the primary content.

10. The method according to claim 8, wherein said step of accessing said auxiliary content further comprises comparing said preferences with trigger data logically associated with one or more auxiliary content items making up the auxiliary content.

11. A method for displaying auxiliary content at a client computer, comprising:
    accessing primary content managed by a content provider;
    accessing the auxiliary content stored on a local storage device of the client computer upon commencing download of the primary content to the client computer, the auxiliary content to be accessed by the client computer based on preferences provided by a distributor of the primary content; and
    displaying the accessed auxiliary content on a display of the client computer during a time when the primary content is being downloaded to the local storage device.

12. A method for displaying auxiliary content at a client computer as recited in claim 11, wherein the auxiliary content is one or more of advertisements, images, movies, music, games, and customer surveys.

13. A method for displaying auxiliary content at a client computer as recited in claim 11, wherein the primary content is downloadable content.

14. A method for displaying auxiliary content at a client computer as recited in claim 13, wherein the downloadable content is defined by one or more of video linear streaming data, a motion picture data, linear audio streaming data, binary program data, and game data.

* * * * *